(No Model.)
C. E. HACKER.
ROAD MAKING MACHINE.
No. 603,139. Patented Apr. 26, 1898.
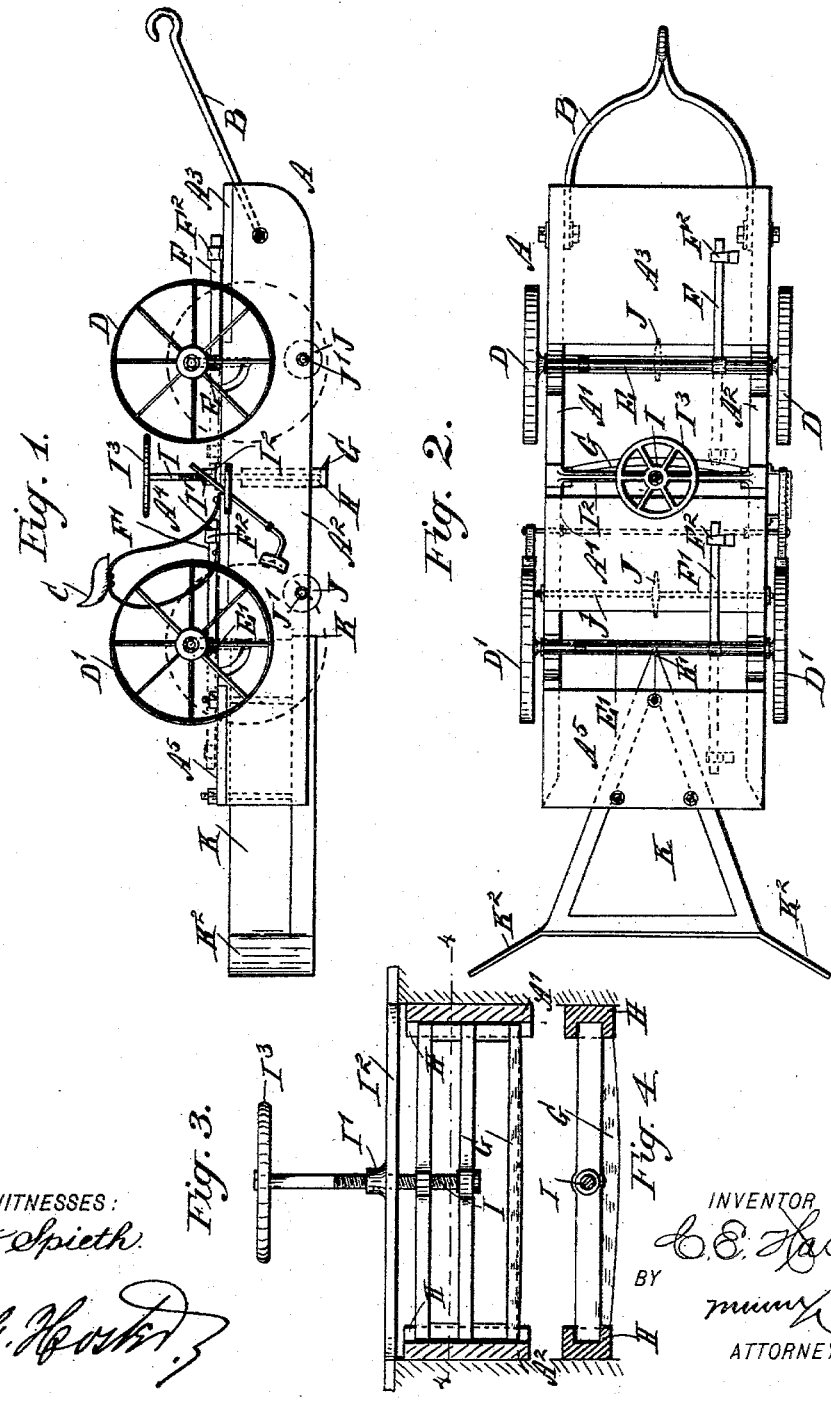
WITNESSES:
Otto Spieth
INVENTOR
C. E. Hacker
BY
ATTORNEYS.

UNITED STATES PATENT OFFICE.

CHARLES E. HACKER, OF BRUNSWICK, MAINE.

ROAD-MAKING MACHINE.

SPECIFICATION forming part of Letters Patent No. 603,139, dated April 26, 1898.

Application filed August 23, 1897. Serial No. 649,198. (No model.)

*To all whom it may concern:*

Be it known that I, CHARLES E. HACKER, of Brunswick, in the county of Cumberland and State of Maine, have invented a new and Improved Road-Making Machine, of which the following is a full, clear, and exact description.

The object of the invention is to provide a new and improved machine for making bicycle roads or paths in a very simple and economical manner, cutting off any bushes, weeds, &c., in the proposed road, and at the same time leveling the ground to make a level path to ride on.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same with the driver's seat omitted. Fig. 3 is an enlarged transverse section of the cutting mechanism, and Fig. 4 is a sectional plan view of the same on the line 4 4 in Fig. 3.

The improved road-making machine is mounted on a vehicle-body A, having the runners A' A², connected with each other at their top edges by transverse boards A³ A⁴ A⁵, as is plainly indicated in the drawings. On the forward ends of the runners A' A² is pivoted a tongue B, to which a horse or other animal is hitched for drawing the machine over the proposed route. On the middle board A⁴ is secured a seat C for the driver.

In order to conveniently move the machine to the proposed route, I provide front and rear wheels D D', journaled on crank-axles E E', respectively, provided with arms F F', respectively, adapted to be swung over to move the front and rear wheels into a lowermost position to engage the ground and to hold the lower ends of the runners above the same when moving the vehicle to the route. When the vehicle is in use, the arms F F' are swung into a forward position, so as to hold the front and rear wheels away from the ground and above the lower edges of the runners, which latter then travel on the ground during the making of the road. The arms F and F' are adapted to be locked in place by suitable catches F², as shown in the drawings.

Below the runners A' A² is arranged a transversely-extending grubbing-knife G, adapted to cut bushes, weeds, and other growth in the proposed path, the said knife being carried by a frame which is fitted to slide vertically in suitable bearings H, attached to the inner side of the said runners. The frame and knife G are raised and lowered, according to the nature of the growth in the path of the machine, by means of a screw-rod I, which is swiveled at its lower end in the lower bar of the knife-frame and turns in a bearing in the upper bar of said frame and in a bearing I', secured on a transversely-extending bar I², attached to the runners A A'.

On the upper end of the screw-rod I is secured a hand-wheel I³, under the control of the operator, for turning the said screw-rod so as to move the knife up or down in its guideways for the purpose previously mentioned. Thus if no bushes are in the way the knife may be moved into an uppermost position above the lower edges of the runners, so as to be completely out of the way.

At the front and rear of the knife G are arranged circular cutters J, held on suitable rods J', connecting the runners A' A² with each other, the said cutters being located at the middle of the machine and in longitudinal alinement with each other and with the apex K' of a scraper K, bolted or otherwise secured to the rear board A⁵. The forward end of the scraper K extends a suitable distance between the runners, as is plainly indicated in Fig. 2, but so as to allow sufficient opening at the sides of the scraper at the ends of the runners for the scraped-up ground to escape from between the runners when the machine is drawn forward. The rear end of the scraper K is provided with angular flanges K² for discharging the ground a suitable distance from the sides of the proposed route.

As indicated in Fig. 1, the lower edges of the scraper K, as well as the cutters J, are a short distance below the lower edges of the runners, so that when the machine is drawn forward the cutters, as well as the scraper, cut into the ground a sufficient distance to level the ground as the machine is dragged along.

Having thus fully described my invention, I claim as new and desire to secure by Letters Patent—

1. A road-making machine comprising a vehicle-body, a transversely-extending knife-blade carried by a frame fitted to slide vertically in suitable bearings, the said knife-blade being adapted to move below the said body to cut the bushes, weeds and other growth in the path of the vehicle-body, and a triangular scraper on the rear end of the vehicle-body for leveling the ground, the rear end of the scraper being provided with angular flanges, substantially as shown and described.

2. A road-making machine comprising a vehicle-body having runners connected with each other, cutters carried by the said runners, and a triangular scraper supported by the said body between the rear ends of the said runners, the lower ends of the scraper as well as the cutters extending below the body and edges of the runners, substantially as shown and described.

3. A road-making machine comprising a vehicle-body having runners connected with each other, cutters carried by the said runners, and a triangular scraper supported by the said body between the rear ends of the said runners, the lower ends of the scraper as well as the cutters extending below the body and edges of the runners, the said cutters and the apex of the scraper being in longitudinal alinement with each other, as set forth.

4. A road-making machine comprising a vehicle-body having runners connected with each other, cutters carried by the said runners, a triangular scraper supported by the said body between the rear ends of the said runners, the lower ends of the scraper as well as the cutters extending below the body and edges of the runners, and a grubbing-knife held vertically adjustable on the said runners, substantially as shown and described.

5. A road-making machine, comprising a vehicle-body having runners connected with each other, a transversely-extending grubbing-knife carried by a frame vertically adjustable in bearings at the inner side of the said runners, a triangular scraper supported by the said body and having its forward end extending between the rear ends of the said runners, the rear end of the said scraper being provided with angular flanges, and circular cutters carried by the said runners at the front and rear of the grubbing-knife, substantially as shown and described.

CHARLES E. HACKER.

Witnesses:
BARRETT POTTER,
GEO. W. SHERMAN.